United States Patent
Horie et al.

(10) Patent No.: US 12,322,809 B2
(45) Date of Patent: Jun. 3, 2025

(54) CURRENT COLLECTOR FOR BATTERY, AND BATTERY

(71) Applicant: TOYO KOHAN CO., LTD., Tokyo (JP)

(72) Inventors: Shinichirou Horie, Tokyo (JP); Hidehiko Kobayashi, Tokyo (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 21 days.

(21) Appl. No.: 16/341,617

(22) PCT Filed: Oct. 3, 2017

(86) PCT No.: PCT/JP2017/035964
§ 371 (c)(1),
(2) Date: Apr. 12, 2019

(87) PCT Pub. No.: WO2018/070302
PCT Pub. Date: Apr. 19, 2018

(65) Prior Publication Data
US 2021/0376331 A1    Dec. 2, 2021

(30) Foreign Application Priority Data
Oct. 14, 2016    (JP) ................. 2016-203133

(51) Int. Cl.
*H01M 4/66*    (2006.01)

(52) U.S. Cl.
CPC ........... *H01M 4/661* (2013.01); *H01M 4/667* (2013.01)

(58) Field of Classification Search
CPC .............. H01M 4/661; H01M 4/667
See application file for complete search history.

(56) References Cited

U.S. PATENT DOCUMENTS

| 2008/0292963 A1* | 11/2008 | Sato ............... H01M 4/661 429/218.1 |
| 2018/0102546 A1* | 4/2018 | Kim ............... H01M 4/667 |

FOREIGN PATENT DOCUMENTS

| JP | 06310147 A | 11/1994 |
| JP | 2002-170554 A | 6/2002 |
| JP | 2005197205 A | 7/2005 |

(Continued)

OTHER PUBLICATIONS

Korean Office Action dated Mar. 8, 2022, issued in Korean Application No. 10-2019-7013694, with English translation.

*Primary Examiner* — Stephan J Essex
(74) *Attorney, Agent, or Firm* — FISHERBROYLES, LLP; Roger L. Browdy

(57) ABSTRACT

[Object]
To provide a current collector for battery, having a strength sufficient to suppress breakage and tears during production feared in association with thinning, and a battery having the current collector.

[Solving Means]
The current collector for battery according to the present invention has at least a first metal layer containing at least a metal selected from Cu, Fe, and Ni, and a second metal layer laminated on the first metal layer and containing at least a metal selected from Cu, Fe, and Ni other than the metal of the first metal layer. One of the first metal layer and the second metal layer contains the Ni, and a laminate interface between the first metal layer and the second metal layer has a roughness Ra≥0.12.

8 Claims, 3 Drawing Sheets

(56) References Cited

FOREIGN PATENT DOCUMENTS

| | | | |
|---|---|---|---|
| JP | 2006-164883 A | | 6/2006 |
| JP | 2006269362 A | * | 10/2006 |
| JP | 2008098094 A | | 4/2008 |
| JP | 20169526 A | | 1/2016 |
| KR | 1020110097410 B1 | | 8/2011 |
| WO | 2011024443 A1 | | 3/2011 |
| WO | 2012091060 A1 | | 7/2012 |

* cited by examiner

CURRENT COLLECTOR FOR BATTERY, AND BATTERY

TECHNICAL FIELD

The present invention relates to a laminated metal foil, and furthermore relates to a current collector for battery suitable for a lithium ion secondary battery and the like, and a battery having this current collector.

BACKGROUND ART

Since a dry battery was born in Japan ahead of the world, batteries which are portable and easy to carry have played important roles in various industries, especially in the electric field. Particularly in recent years, miniaturization of electronic equipment has become remarkable, and portable electronic equipment such as mobile phones and portable information terminals are widely spread. In such a portable electronic equipment, a rechargeable and repeatedly usable secondary battery is mounted as a power source for the equipment.

Secondary batteries are not mounted only in the portable electronic equipment described hereinbefore, but have been gradually mounted also in vehicles such as hybrid automobiles and electric automobiles in association with gasoline depletion problems and environmental problems. As for the secondary batteries mounted in the portable electronic equipment or automobiles described hereinbefore, lithium ion secondary batteries (hereinafter, also referred to as "LiB") are attracting attention as high-performance batteries with high output and long life.

In addition, although the LiB described hereinbefore has become a major player in portable equipment applications, nickel-hydrogen secondary batteries have also been continuously adopted, and improved and studied as in-vehicle use and stationary battery use, from the viewpoints of safety and long-term reliability.

Especially in the automotive field, needs for electric vehicles are rapidly increasing, and development corresponding to high capacity and rapid charging/discharging of the in-vehicle lithium ion secondary batteries is accelerated in the aim of full-scale diffusion. In addition, the performance of the nickel-hydrogen secondary batteries is actively enhanced for hybrid automobiles and the like.

Herein, in order to increase the capacity of batteries including lithium ion secondary batteries and nickel-hydrogen batteries, it is effective to thin the current collector, but when the current collector is thinned, the strength is lowered, and there is a problem of deformation or breakage of the current collector.

As a countermeasure, for example, PTL 1 proposes a technique that at least one surface of an electrolytic foil made of a metal material having a low lithium compound producibility is subjected to electroplating using a plating bath containing a nickel salt and an ammonium salt to form a hard nickel plating layer on the surface of the electrolytic foil.

In addition, for example, PTL 2 discloses a technique that a copper foil used as an anode current collector is subjected to nickel plating with a low residual stress of copper to provide an anode current collector with reduced copper sulfide generation and excellent in conductivity.

CITATION LIST

Patent Literature

[PTL 1]
 JP 2005-197205A
[PTL 2]
 JP 2016-9526A

SUMMARY

Technical Problems

However, with the technique described in the Patent Literature described hereinbefore, although the strength as the current collector is improved to a certain extent, there is still room for improvement in at least the following points.

That is, in recent years, demand for battery performance has been further grown, and if the current collector itself is also thinned, the amount of active materials can be increased only to an extent of the thinned amount. Thus, a strength enough to suppress breakage, tears and the like during production associated with the thinning of this current collector is required.

Furthermore, for example, the anode current collector is required to have a high strength capable of following properties of new active materials such as a silicon capable of substituting for carbon.

However, PTL 1 and PTL 2 described hereinbefore disclose only the technical idea of forming a multiple layer using a nickel film, but do not yet disclose a concrete interlayer structure for achieving the strength as described hereinbefore at a high level.

The present invention has been made in view of solving the above problems, and an object of the present invention is to provide a current collector for battery having a strength enough to suppress breakage and tears during production which are concerned in association with the thinning, and a battery having the current collector.

Solution to Problems

In order to solve the above problems, (1) a current collector for battery according to an embodiment of the present invention characteristically has at least a first metal layer containing at least a metal selected from Cu, Fe, and Ni, and a second metal layer laminated on the first metal layer and containing at least a metal selected from Cu, Fe, and Ni other than the metal of the first metal layer, in which a laminate interface between the first metal layer and the second metal layer has a roughness $Ra \geq 0.12$.

In the current collector for battery according to (1) above, it is more preferable that (2) the laminate interface has a roughness $Ry \geq 0.1$.

In the current collector for battery according to (1) or (2) above, it is more preferable that (3) the laminate interface has a roughness $Rz \geq 0.4$.

In the current collector for battery according to any one of (1) to (3) above, it is preferable that (4) the first metal layer is composed of Ni, and the second metal layer is composed of Cu.

In the current collector for battery according to (4) above, it is preferable that (5) the first metal layer is sandwiched between the second metal layers, and the current collector for battery has a thickness of 4 to 10 µm.

In the current collector for battery according to any one of (1) to (3) above, it is preferable that (6) the first metal layer is composed of Fe, and the second metal layer is composed of Ni.

In the current collector for battery according to (6) above, it is preferable that (7) the first metal layer is sandwiched between the second metal layers, and the current collector for battery has a thickness of 4 to 20 µm.

In the current collector for battery according to any one of (1) to (7) above, it is preferable that (8) when a ratio of an actually-measured surface area to a surface area of a measurement visual field on the laminate interface is defined as S and an interface roughness index of the laminate interface is defined as Ra/S, the laminate interface has an interface roughness index (Ra/S)≥0.06.

In order to solve the above problems, the battery according to another embodiment of the present invention characteristically has the current collector for battery according to any one of (1) to (8) above.

Advantageous Effect of Invention

The present invention can achieve a high strength (tensile strength) exceeding a theoretical value by adjusting the roughness Ra of the laminate interface between the first metal layer and the second metal layer to Ra≥0.12.

DESCRIPTION OF EMBODIMENTS

First Embodiment

Hereinafter, embodiments for carrying out the present invention will be explained.

Figure 1:
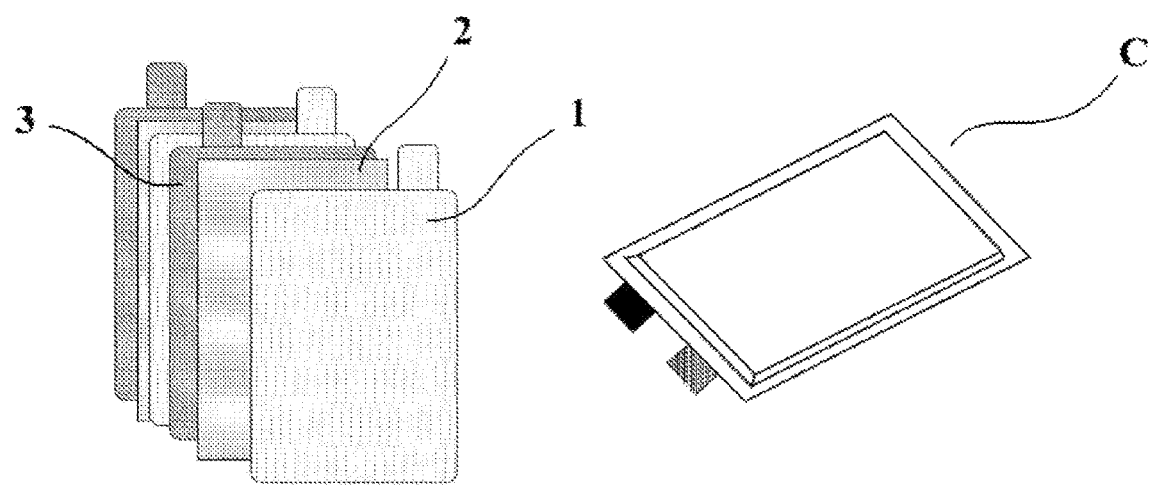
FIG. 1 illustrates schematic diagrams of a battery C and a constituent of the battery C according to an embodiment of the present invention.

FIG. 1 illustrates schematic diagrams of a battery C and a constituent of the battery C according to an embodiment of the present invention. As depicted in the diagrams, the battery C according to the present embodiment is a lithium ion secondary battery employing a so-called cell structure, and is configured so as to include at least a cathode 1, a separator 2, an anode 3, and an electrolyte not illustrated in the figures.

Hereinafter, the battery C will be explained with reference to a lithium ion secondary battery, but the battery according to the present invention is not limited to the lithium ion secondary battery, but may be applied to e.g. another secondary battery such as a nickel-hydrogen battery and a lead storage battery, and a primary battery such as a manganese battery.

The cathode 1 is a supply source of lithium ions, and is generally composed of a current collector and an active material applied on the current collector. The suitable current collector for the cathode is exemplified by an aluminum foil which is electrochemically stable under a high potential environment among electroconductive metals. In addition, as the suitable active material for the cathode, various known active materials can be applied, and can be exemplified by a layered oxide type such as $LiMO_2$, a spinel type such as $LiM_2O_4$, a solid solution type such as $Li_2MO_3$-$LiMO_2$, and the like.

The separator 2 separates between the cathode 1 and the anode 3 without disturbing traffic of lithium ions in the electrolyte. For the separator 2, various known materials can be applied, which can be exemplified by a polyolefin non-woven fabric such as polypropylene and polyethylene.

The electrolyte serves for ionic migration between the cathode 1 and the anode 3. Such an electrolyte is not particularly limited, but for example, various known electrolytes such as an electrolyte prepared by dissolving $LiPF_6$ in a mixed solvent of ethylene carbonate and a dialkyl carbonate may be used.

Like the cathode 1, the anode 3 is composed of the current collector and the active material. As the suitable current collector for the anode, e.g. a copper foil can be used. As the active materials of the anode, a solid carbon material is preferable, and more specifically, e.g. an amorphous carbon such as hard carbon and soft carbon, a three-dimensional crystalline carbon such as diamond and graphite, a nano-carbon material such as nanotube and fullerene, and the like may be used.

<Structure of Current Collector>

Figure 2:
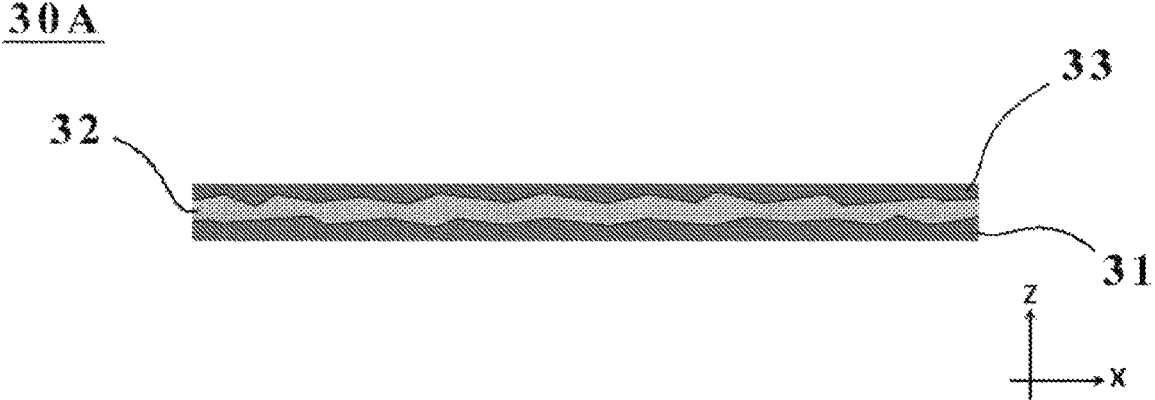
FIG. 2 illustrates a sectional view of an anode current collector for battery 30A according to an embodiment of the present invention.

Next, a detailed structure of the current collector in the anode 3 will be described in detail with reference to FIG. 2. Note that, although the anode current collector will be explained as an example of the current collector hereinafter, the current collector according to the present invention may be applied not only to the anode current collector but also to the cathode current collector. In addition, in FIG. 2, the roughness of the laminate interface described hereinafter is exaggerated for emphasis, but in fact the current collector does not visually have such a roughness as in FIG. 2 (the same applies to FIG. 4).

As described above, the anode 3 of the battery C is composed of a current collector, and in the present embodiment, the anode 3 is configured so that a plurality of metal layers are laminated as depicted hereinafter. That is, as depicted in FIG. 2, a current collector 30A as a battery anode current collector is composed of a first metal layer 31, a second metal layer 32, and a third metal layer 33.

The current collector 30A has a total thickness of 4 to 20 μm, more preferably 4 to 10 μm. A thickness of more than 20 μm does not originally fit the design concept from the background aiming at high capacity based on thinning, and furthermore the cost merit of the known rolled foil is decreased. On the other hand, a thickness of less than 4 μm makes it difficult to provide a sufficient strength countering an influence associated with charging and discharging, and further significantly deteriorates handleability during production. This is because the thickness of less than 4 μm requires a carrier or a support like a Cu foil with a carrier for e.g. a flexible printed circuit board application or the like, and therefore increases the cost.

As will be described later, for example, when the metal layer is a laminate of Cu and Ni or a laminate of Cu and Fe, the upper limit of the thickness is preferably 10 μm. In addition, when the metal layer is a laminate of Ni and Fe, the upper limit of the thickness is preferably 20 μm.

The first metal layer 31 is composed of at least a metal selected from Cu, Fe, and Ni. Incidentally, the metal layer according to the present embodiment may have not only a configuration of the metal simple substance described hereinbefore (e.g. Ni simple substance, Cu simple substance, or Fe simple substance) but also a configuration of an alloy containing these metals (e.g. Ni alloy, Cu alloy, or Fe alloy).

The first metal layer 31 has a thickness of e.g. 1 to 10 μm within a limit not exceeding the total thickness of the current collector 30A. Incidentally, when the first metal layer 31 is formed by plating as described hereinafter, the Cu described as the first metal plating layer may be a Cu plating layer prepared using a known copper sulfate plating bath without adding various brighteners (for convenience, also referred to as "matte Cu plating layer"), or a bright Cu plating layer prepared by further adding an additive such as the brightener (including a semi-brightener). However, the "bright" or "matte" described hereinbefore depends on evaluation of visual appearance, it is difficult to classify the brilliance based on strict numerical values, and furthermore the brilliance can also be varied depending on other parameters such as a bath temperature described hereinafter. Thus, "bright" and "matte" used in the present embodiment are definitions only in a case of focusing on the parameters of the additive (brightener).

As will be described hereinafter, since the first metal layer 31, the second metal layer 32, the third metal layer 33 and the like are sequentially laminated in this order during the production of the current collector 30A, the first metal layer 31 is positioned as the lowermost layer. However, the order of the laminated layers described hereinbefore is merely an example, and the laminating order is not limited to the ascending order, and the layers may be laminated in descending order.

In addition, the first metal layer 31 is not necessarily positioned as the outermost layer. For example, in the configuration that the layers are laminated in the ascending order as described hereinbefore, a different metal layer (e.g. the second metal layer 32, a layer composed of another metal, or the like) may be additionally formed under the first metal layer 31. In addition, even in the configuration that the layers are laminated in the descending order, the different metal layer described hereinbefore may be additionally formed on the first metal layer 31.

Hereinafter, the explanation will be continued with reference to the configuration that the respective metal layers are laminated in the ascending order.

The second metal layer 32 is laminated on the first metal layer 31 and is composed of at least a metal different from the first metal layer 31 and selected from Cu, Fe, and Ni. The second metal layer 32 has a thickness of e.g. 1 to 10 μm within a limit not exceeding the total thickness of the current collector 30A. Incidentally, when the second metal layer 32 is formed by plating like the first metal layer 31, a bright Cu plating layer or a matte Cu plating layer can be used for the Cu described hereinbefore as the second metal plating layer.

In the present embodiment, one of the first metal layer 31 and the second metal layer 32 may contain Ni. Thus, for example, when the first metal layer 31 is Cu, the second metal layer 32 is Ni, and when the first metal layer 31 is Ni, the second metal layer 32 is e.g. Cu. At this time, a ratio of the thickness of Ni to the thickness of the anode current collector may be 50% or lower.

Since the present invention can be applied to various batteries, the second metal layer 32 may be Fe e.g. in a case that the first metal layer 31 is Cu. In other words, the first metal layer 31 and the second metal layer 32 in the present embodiment can be exemplified by combinations depicted in the following Table 1. In this case, a different metal layer may be further formed under the first metal layer 31, or a different metal layer may also be further formed on the second metal layer 32 as already described hereinbefore (the same applies to the following). Note that these metals may also include alloys, as described hereinbefore.

TABLE 1

| | Pattern 1 | Pattern 2 | Pattern 3 | Pattern 4 | Pattern 5 | Pattern 6 |
|---|---|---|---|---|---|---|
| First metal layer 31 | Cu | Fe | Ni | Ni | Cu | Fe |
| Second metal layer 32 | Ni | Ni | Cu | Fe | Fe | Cu |

The third metal layer 33 is formed on the second metal layer 32. The third metal layer 33 has a thickness of e.g. 1 to 8 μm within a limit not exceeding the total thickness of the current collector 30A. The third metal layer 33 is not indispensable, and a two-layer structure of the first metal layer 31 and the second metal layer 32 may be adopted.

In the present embodiment, the third metal layer 33 is formed of the same type of material as the first metal layer 31 described hereinbefore. In other words, in the present embodiment, it can also be said that the second metal layer 32 is sandwiched between the first metal layers 31 (=the third metal layers 33). Thus, the first metal layer 31, the second metal layer 32, and the third metal layer 33 in the present embodiment can be exemplified by combinations depicted in the following Table 2. Note that these metals may also include alloys, as described hereinbefore.

TABLE 2

| | Pattern 7 | Pattern 8 | Pattern 9 | Pattern 10 | Pattern 11 | Pattern 12 |
|---|---|---|---|---|---|---|
| First metal layer 31 | Cu | Fe | Ni | Ni | Cu | Fe |
| Second metal layer 32 | Ni | Ni | Cu | Fe | Fe | Cu |
| Third metal layer 33 | Cu | Fe | Ni | Ni | Cu | Fe |

In the present embodiment, the first metal layer 31 and the third metal layer 33 are of the same type of metal layers or metal plating layers, but not limited to this configuration, and the first metal layer 31 and the third metal layer 33 may be composed of different types of metals. In this case, the configuration can be exemplified by combinations depicted in the following Table 3. Note that these metals may also include alloys, as described hereinbefore.

TABLE 3

| | Pattern 13 | Pattern 14 | Pattern 15 |
|---|---|---|---|
| First metal layer 31 | Ni | Cu | Fe |
| Second metal layer 32 | Fe | Ni | Cu |
| Third metal layer 33 | Cu | Fe | Ni |

<Roughness of Laminate Interface>

As described above, the current collector 30A according to the present embodiment is configured so that a plurality of metal layers are laminated, but the lamination itself of a plurality of metal layers is also disclosed in the Patent Literature described hereinbefore.

Figure 5:
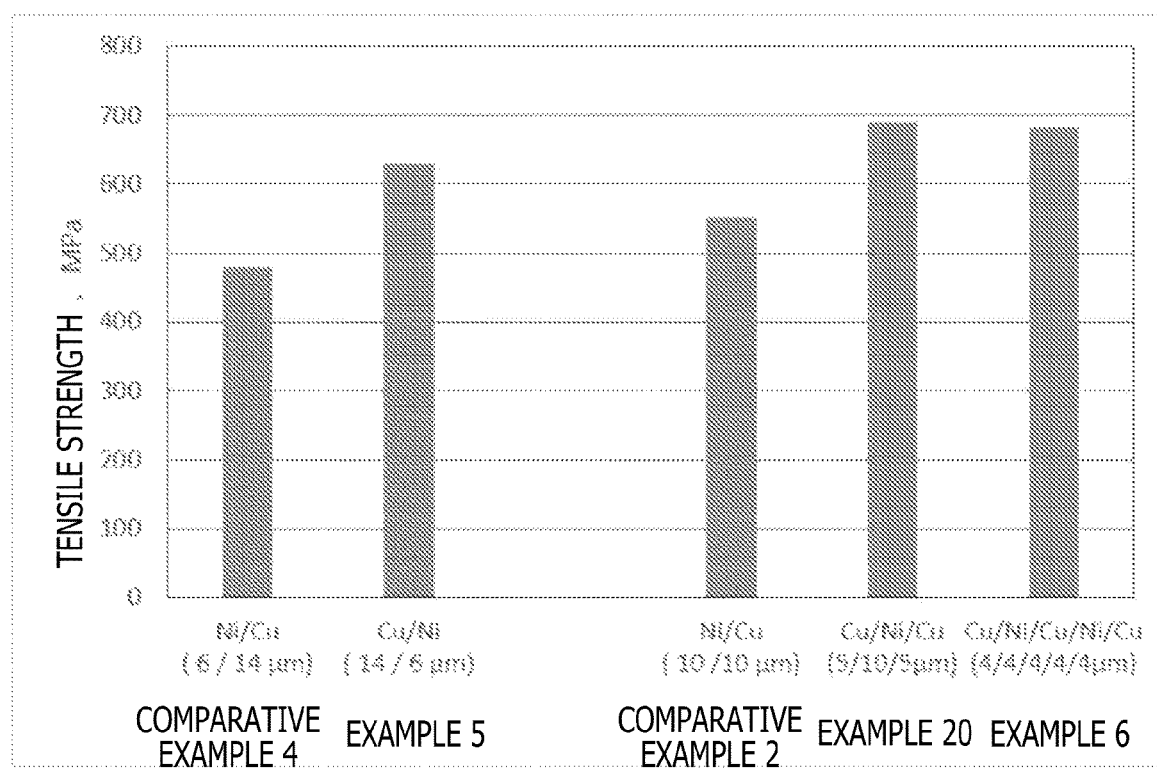
FIG. 5 illustrates a graph for comparing tensile strengths among particular Examples and Comparative Examples.

On the other hand, the inventors of the present invention investigated laminated foils composed of dissimilar metal plating layers as current collectors for battery, meanwhile they found that even when the laminates had the same metal combination, total thickness, and thickness distribution ratio, the laminates had considerably different tensile strengths in the final metal laminated foils depending on the laminated structures. As an example, FIG. 5 illustrates a graph of tensile strengths in characteristic examples of laminate materials for the Cu layer and the Ni layer from Examples and Comparative Examples described hereinafter.

First, a first example is explained with reference to the graphs of Comparative Example 4 and Example 5. As can be understood from this graph, both of them have a Cu layer thickness of 14 μm, an Ni layer thickness of 6 μm, and therefore a total laminate material thickness of 20 μm. However, when comparing the case of plating the Ni layer on the Cu layer (Comparative Example 4) with the case of conversely plating the Cu layer on the Ni layer (Example 5), the tensile strength of the latter is 30-odd percent higher than of the former.

Next, a second example is explained with reference to the graphs of Comparative Example 2 and Example 20. As can be understood from this graph, both of them have a total laminate material thickness of 20 μm, in which a thickness of the Ni layer is 10 μm. However, Comparative Example 2 has a two-layer structure that the Ni layer having a thickness of 10 μm is plated on the Cu layer having a thickness of 10 μm, whereas Example 20 has a three-layer structure that the Ni layer having a thickness of 10 μm is plated on the Cu layer having a thickness of 5 μm, on which furthermore the Cu layer having a thickness of 5 μm is plated. As described hereinbefore, in both Comparative Example 2 and Example 20, their Cu layers had the same total thickness of 10 μm, but it was found that tensile strengths of the Cu layers were different from each other by 20% or higher.

Furthermore, a third example is explained with reference to the graphs of Comparative Example 2 and Example 36. As can be understood from this graph, Example 36 has a five-layer structure that the Ni layer and the Cu layer are alternately formed on the Cu layer, in which a total thickness ratio of the Ni layer having a tensile strength higher than of the Cu layer is 40%. However, in Example 36, although the total thickness ratio of the Ni layers is somewhat low compared to 50% in Comparative Example 2, the tensile strength in Example 36 is as high as 20% or higher than of Comparative Example 2 having the two-layer structure.

In relation to such a difference in the tensile strengths of the laminated metal foils, the present inventors focused on a structure between laminated metal layers i.e. a roughness of the laminate interface, and as a result, they found that an optimum roughness of the interface between the metal layers was important for achieving a high strength laminated metal foil at a high level.

Incidentally, for the roughnesses in the present embodiment, values measured by a measurement method in compliance with JIS B0601-1994 standard are used.

More specifically, in the present embodiment, among the roughnesses of the laminate interfaces, it is important that the laminate interface between the first metal layer 31 and the second metal layer 32 has a roughness Ra (arithmetic average roughness)≥0.12. Thereby, a higher strength (tensile strength) than the theoretical strength calculated in compliance with mixed rules of the composite material can be achieved. Although the physical mechanism regarding the action and effect has not been completely understood, it is presumed that irregularities at a crystal grain level on the laminate interface affect dislocation in material deformation.

As a method for controlling the roughnesses such as Ra, and Ry (maximum height) and Rz (ten point average roughness) described hereinafter, for example, adjustment of any parameters of (a) plating thickness (energizing quantity), (b) temperature of plating bath, (d) current density of plating bath, (d) bath composition (additive: presence of brightener), and (e) each ion concentration of Cu, Ni, and Fe in the plating bath is conceivable. Among them, an example in which the roughness such as Ra is adjusted to a desired value by controlling the (a) and (d) will be explained hereinafter, but the present invention is not limited to this aspect, and the roughness may be adjusted to the desired value using other parameters.

In the case of a multilayer structure having three or more layers, the interface between the first metal layer 31 and the second metal layer 32 does not necessarily have a roughness Ra≥0.12, and it is sufficient any interface such as the interface between the second metal layer 32 and the third metal layer 33 has a roughness Ra≥0.12. The same applies to other Ry, Rz, and interface roughness indices.

Additionally, in the present embodiment, it is more preferable that, among the roughnesses of the laminate interfaces, the laminate interface between the first metal layer 31 and the second metal layer 32 has a roughness Ry≥0.1.

Additionally, in the present embodiment, it is more preferable that, among the roughnesses of the laminate interfaces, the laminate interface between the first metal layer 31 and the second metal layer 32 has a roughness Ry≥0.4.

[Interface Roughness Index]

The roughness of the laminate interface according to the present embodiment is not limited to Ra, Ry, and Rz described hereinbefore, and an interface roughness index described hereinafter may be used.

That is, a ratio of an actually-measured surface area to a measurement visual field of a measurement apparatus for measuring the roughness is defined as S, and a value obtained by dividing the Ra by the S is defined as "interface roughness index (Ra/S)."

In this case, the interface roughness index (Ra/S) according to the present embodiment preferably meets a relationship represented by the following formula (1).

$$\text{Interface roughness index}(Ra/S) \geq 0.06 \qquad (1)$$

Thereby, in addition to the effects described hereinbefore, errors due to e.g. individual differences of measurement apparatus or the like can also be reduced to calculate an appropriate roughness of the laminate interface.

In addition, the roughness of the laminate interface described hereinbefore may meet the following relationship.

$$Ra/Ry \geq 0.06$$

$$Ra/Rz \geq 0.07$$

<Tensile Strength of Current Collector>

As described hereinbefore, the current collector 30A according to the present embodiment has a theoretical strength ratio of approximately 1.1 to 1.4 times, exhibiting a high tensile strength.

Herein, for the theoretical tensile strengths according to the present embodiment, values of tensile strengths of layers having different thicknesses were measured in a simple substance state, and these values were used to calculate the theoretical tensile strengths in compliance with mixed rules of the materials. Specifically, for example, in a case of a laminated foil having a total foil thickness of 20 μm composed of a Cu layer (thickness: 10 μm) and an Ni layer (thickness: 10 μm), a tensile strength (A) of a simple Cu foil (thickness: 20 μm) and a tensile strength (B) of a simple Ni foil (thickness 20 μm) were measured, each of which was multiplied by the thickness ratio of each layer of the laminated foil, and the two products were summed.

$$A \times (10/20) + B \times (10/20)$$

The obtained value was defined as a theoretical strength of the laminated foil.

Incidentally, in the following Examples and Comparative Examples, when the total thickness of the laminated foil was 12 μm or 15 μm, the tensile strength of each corresponding metal simple substance was substituted with the tensile strength in the case of the thickness of 10 μm to calculate a theoretical strength. When the total thickness of the laminated foil was 4 to 10 μm, or 20 μm, a theoretical strength was calculated using the tensile strength value of the metal simple substance corresponding to the total foil thickness of the laminated foil.

Table 4 depicts actually-measured tensile strength values of a matte Ni plating, a bright Ni plating, a matte Cu plating, a bright Cu plating, and a Fe plating individually in a single layer state, measured using a tensile tester (universal material tester, TENSILON RTC-1350A, manufactured by ORIENTEC Co., LTD.).

For the tensile strength of the current collector in the present embodiment, a value measured in compliance with the tensile test method of JIS K 6251 (in 2010) is used. The tensile strength of the current collector is a value measured at 25° C.

TABLE 4

| Material name | Foil thickness [μm] | Mechanical property Tensile strength [MPa] |
|---|---|---|
| Ni | 4 | 621 |
| Ni | 5 | 641 |
| Ni | 6 | 664 |
| Ni | 8 | 666 |
| Ni | 10 | 687 |
| Ni | 20 | 744 |
| Bright Ni | 20 | 689 |
| Cu | 4 | 242 |
| Cu | 5 | 247 |
| Cu | 6 | 246 |
| Cu | 8 | 252 |
| Cu | 10 | 252 |
| Cu | 20 | 264 |
| Bright Cu | 4 | 311 |
| Bright Cu | 5 | 321 |
| Bright Cu | 6 | 329 |
| Bright Cu | 8 | 333 |
| Bright Cu | 10 | 339 |
| Bright Cu | 20 | 343 |
| Fe | 6 | 375 |
| Fe | 10 | 408 |
| Fe | 20 | 417 |

"Ni": Matte Ni
"Cu": Matte Cu

<Production Method for Current Collector>

Figure 3:
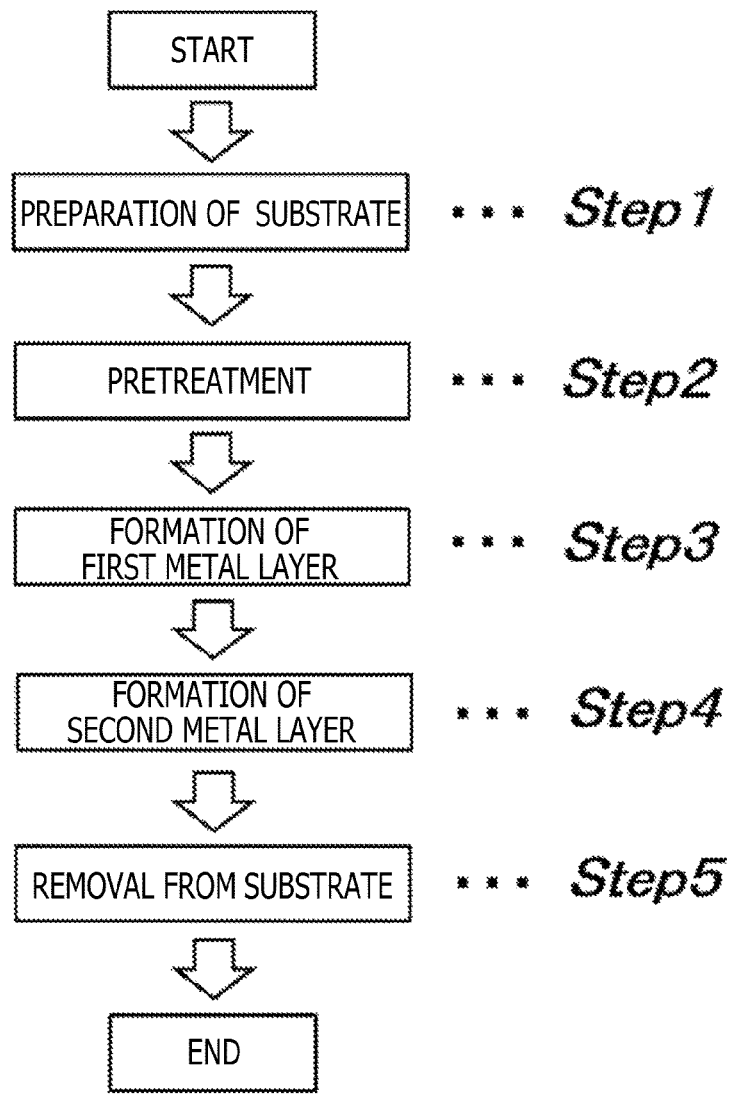
FIG. 3 illustrates a schematic diagram for explaining a production method for the anode current collector for battery according to an embodiment of the present invention.

Next, a production method for the anode current collector (current collector 30A) according to the present embodiment will be explained. The production method for the anode current collector according to the present embodiment is not particularly limited, but the anode current collector is preferably produced using e.g. plating (electrolytic foil). More specifically, for example, in steps as depicted in FIG. 3, a roll to roll method may be used, in which the surface is sequentially treated in a process that a coiled substrate is drawn and conveyed. At this time, for the substrate, e.g. a metal such as Ti and SUS can be used.

In the steps, conditions of the bright Cu plating are as follows.

[Bright Cu Plating Condition]
Bath composition: a known brightener (additive) is added to a known copper sulfate bath composed mainly of copper sulfate (one example is described hereinafter).
Copper sulfate: 150 to 250 g/L
Sulfuric acid: 30 to 60 g/L
Hydrochloric acid (35%): 0.1 to 0.5 ml/L
Temperature: 25° C. to 50° C.
pH: 1 or lower
Stirring: air stirring or jet stream stirring
Current density: 1 to 30 A/dm$^2$ Incidentally, the additive in the present invention is used mainly for the purpose of controlling the roughness of the laminate interface described hereinbefore. Consequently, various known additives can be used regardless of the type of the brightener, so that the roughness of the laminate interface can be adjusted to a desired value.

Conditions of the matte Cu plating are as follows.

[Matte Cu Plating Condition]
Bath composition: a known copper sulfate bath composed mainly of copper sulfate (one example is described hereinafter).
Copper sulfate: 150 to 250 g/L
Sulfuric acid: 30 to 60 g/L
Hydrochloric acid (35%): 0.1 to 0.5 ml/L
Temperature: 25° C. to 70° C.
pH: 1 or lower
Stirring: air stirring or jet stream stirring
Current density: 1 to 30 A/dm$^2$ Conditions of the matte Ni plating are as follows.

[Matte Ni Plating Condition]
Bath composition: a known nickel sulfamate plating bath (one example is described hereinafter).
Nickel sulfamate: 150 to 300 g/L
Nickel chloride: 1 to 10 g/L
Boric acid: 5 to 40 g/L As for the bath composition, besides the nickel sulfamate plating bath, a known watt bath may be used.

In addition, as long as a desired roughness of the laminate interface can be obtained, an additive such as a known brightener (an organic substance necessary for obtaining brilliance) may be further added to the plating bath to form a bright Ni plating or a semi-bright Ni plating.

Conditions of the Fe plating are as follows.

[Fe Plating Condition]
Bath composition: a known iron chloride plating bath (one example is described hereinafter).
Ferrous chloride: 800 to 1000 g/L
Hydrochloric acid (35%): S to 30 g/L
Temperature: 70° C. to 95° C.
pH: 1 or lower
Stirring: air stirring or jet stream stirring
Current density: 1 to 20 A/dm$^2$ In the present embodiment, although the example that Cu plating, Fe plating, and Ni plating are sequentially carried out on the substrate by the roll to roll method has been explained, the present invention is not limited to this aspect. That is, in the anode current collector (current collector 30A) according to the present embodiment, all the metal layers are not necessarily composed of plating layers, and, for example, some layers may be formed by a technique other than plating, e.g. foil rolling.

Second Embodiment

Figure 4:
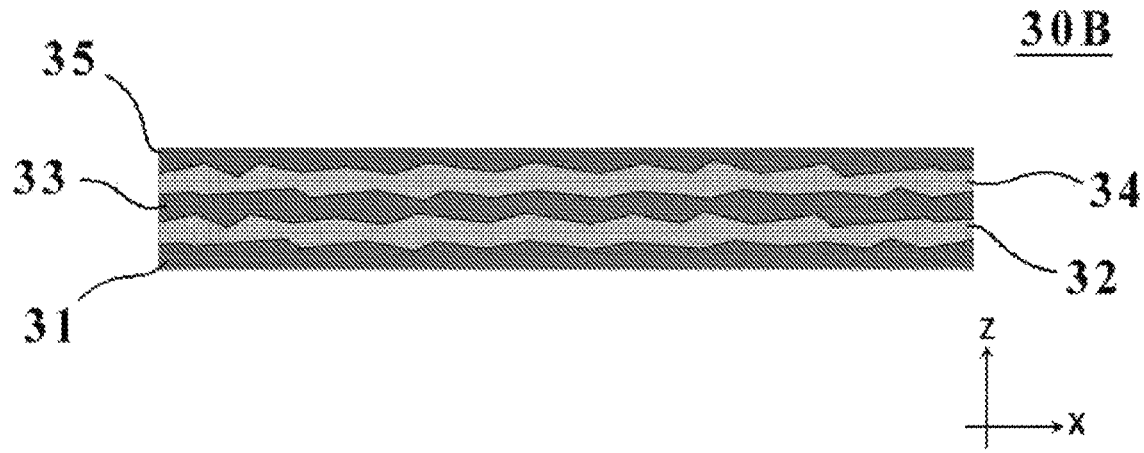
FIG. 4 illustrates a sectional view of an anode current collector for battery 30B according to another embodiment of the present invention.

Next, the second embodiment of the present embodiment will be explained with reference to FIG. 4.

In the first embodiment described hereinbefore, the current collector 30A has a two-layer structure or a three-layer structure, but the present embodiment is characterized in that the current collector has a four or more-layer structure.

More specifically, the current collector 30B according to the present embodiment has a five-layer structure, in which the first metal layer 31, the second metal layer 32, the third metal layer 33, a fourth metal layer 34, and a fifth metal layer 35 are sequentially laminated from the lowermost layer.

At this time, the first metal layer 31, the third metal layer 33, and the fifth metal layer 35 may be composed of the same metal, and the second metal layer 32 and the fourth metal layer 34 may be composed of the same metal. In other words, it can be said that the third metal layer 33 and the fifth metal layer 35 are substantially the first metal layer 31, and the fourth metal layer 34 is substantially the second metal layer 32.

As described above, in the present embodiment, at least four different metal layers with any combination selected from Cu, Ni, and Fe may be alternately laminated. Then, the first metal layer 31 to the fifth metal layer 35 in the present embodiment can be exemplified by combinations depicted in the following Table 5. Note that these metals may also include alloys, as described hereinbefore.

Although the current collector 30B according to the present embodiment has a five-layer structure, the present invention is not limited to the five-layer structure, but may have a four-layer structure, or a six or more-layer structure.

Furthermore, in the present embodiment, all of the layers described hereinbefore may be composed of plating layers.

TABLE 5

| | Pattern 16 | Pattern 17 | Pattern 18 | Pattern 19 | Pattern 20 | Pattern 21 |
|---|---|---|---|---|---|---|
| First metal layer 31 | Ni | Cu | Ni | Fe | Cu | Fe |
| Second metal layer 32 | Cu | Ni | Fe | Ni | Fe | Cu |
| Third metal layer 33 | Ni | Cu | Ni | Fe | Cu | Fe |
| Fourth metal layer 34 | Cu | Ni | Fe | Ni | Fe | Cu |
| Fifth metal layer 35 | Ni | Cu | Ni | Fe | Cu | Fe |

EXAMPLE

Hereinafter, the present invention will be more specifically described with reference to Examples.

Example 1

The matte Cu was selected as the first metal layer 31, and Ni was selected as the second metal layer 32. More specifically, first, a known Ti substrate was used as a substrate on which a current collector is to be formed, and the Ti substrate was subjected to a known pretreatment such as pickling and water washing.

Subsequently, the pretreated Ti substrate was immersed in a matte Cu plating bath described hereinafter to form the first metal layer 31 (matte Cu plating layer) having a thickness of 2 μm as an electrolytic foil on the Ti substrate.
[Matte Cu Plating Condition]
  Bath composition: a copper sulfate plating bath composed mainly of 200 g/L of copper sulfate
    Copper sulfate: 200 g/L
    Sulfuric acid: 45 g/L
    Hydrochloric acid: 0.3 ml/L
    Temperature: 50° C.
    pH: 1 or lower
    Stirring: air stirring
    Current density: 20 A/dm$^2$ After the first metal layer 31 is formed on the Ti substrate, the first metal layer 31 was washed, and then surface roughnesses (Ra, Ry, Rz) of the first metal layer 31 were measured using a non-contact surface roughness measuring apparatus described hereinafter. As described above, the roughnesses in Example 1 were measured by a measuring method in compliance with JIS B0601-1994 standard. Also, an actually-measured value relative to the following set measurement visual field was separately recorded as a surface area.
  Measuring apparatus: Laser microscope LEXT OLS3500 manufactured by Olympus Corporation
  Measurement visual field: 100 μm-100 μm Subsequently, the Ti substrate having the first metal layer 31 was immersed in an Ni plating bath described hereinafter to form the second metal layer 32 (Ni plating layer) having a thickness of 2 μm on the first metal layer 31.
[Ni Plating Condition]
  Bath composition: a nickel sulfamate bath
    Nickel sulfamate: 300 g/L
    Nickel chloride: 10 g/L
    Boric acid: 20 g/L
  Temperature: 50° C.
  pH: 4
  Stirring: air stirring
  Current density: 20 A/dm$^2$ Incidentally, although additives were not particularly added to the plating bath in this Example, an additive such as a known brightener (an organic substance necessary for obtaining brilliance) may added to the plating bath to form a bright Ni plating as long as a desired roughness can be obtained (the same applies to the following Examples 2 to 5, 9 to 27, and 31 to 37, and Comparative Examples 1 to 6).

Subsequently, the electrodeposited first metal layer 31 and second metal layer 32 were sufficiently dried, and then removed from the Ti substrate to obtain a laminated metal foil (battery current collector in this Example).

Then, the resulting current collector was subjected to a tensile test using a tensile tester (universal material tester, TENSILON RTC-1350A, manufactured by ORIENTEC Co., LTD.) in the same manner as described hereinbefore to measure a mechanical strength (tensile strength). As described above, the tensile strength in Example 1 was measured in compliance with the tensile test method of JIS K6251 (in 2010).

Example 2

The same procedure as in Example 1 was implemented except that the first metal layer 31 (matte Cu plating layer) had a thickness of 5 μm and the second metal layer 32 (Ni plating layer) had a thickness of 5 μm.

Example 3

The same procedure as in Example 1 was implemented except that the first metal layer 31 (matte Cu plating layer) had a thickness of 10 μm and the second metal layer 32 (Ni plating layer) had a thickness of 10 μm.

Example 4

A bright Cu plating layer was selected as the first metal layer 31, and a Ni plating layer was selected as the second metal layer 32. More specifically, first, a known Ti substrate was used as a substrate on which the current collector was to be formed, and the Ti substrate is subjected to a known pretreatment such as pickling and water washing.

Subsequently, the pretreated Ti substrate was immersed in a bright Cu plating bath described hereinafter to form a first metal layer 31 (bright Cu plating layer) having a thickness of 2 μm as an electrolytic foil on the Ti substrate.

[Bright Cu Plating Condition]
  Bath composition: a brightener (additive) was added to a copper sulfate plating bath composed mainly of 200 g/L of copper sulfate.
    Copper sulfate: 200 g/L
    Sulfuric acid: 45 g/L
    Hydrochloric acid: 0.3 g/L
    Brightener: an appropriate amount (approximately 0.3 to 10 ml/L) of known decorative copper sulfate plating brightener
  Temperature: 30° C.
  pH: 1 or lower
  Stirring: air stirring
  Current density: 5 A/dm$^2$ Incidentally, the brightener described hereinbefore is merely an example. Another known brightener may be appropriately used so that the roughness of the interface between the metal layers is a desired value, as described above.

After the first metal layer 31 was formed on the Ti substrate, the first metal layer 31 was washed with water, and then surface roughnesses (Ra, Ry, Rz) and the like of the first metal layer 31 were measured in the same manner as in Example 1.

Subsequently, the Ti substrate having the first metal layer 31 was immersed in the same Ni plating bath as in Example 1 to form the second metal layer 32 (Ni plating layer) having a thickness of 2 μm on the first metal layer 31.

Subsequently, the electrodeposited first metal layer 31 and second metal layer 32 were sufficiently dried, and then removed from the Ti substrate to obtain a laminated metal foil (battery current collector in this Example). Then, the resulting laminated metal foil was subjected to a tensile test to measure a mechanical strength (tensile strength) in the same manner as described hereinbefore.

Example 5

The same procedure as in Example 4 was implemented except that the first metal layer 31 was an Ni plating layer, the second metal layer 32 was a bright Cu plating layer, the first metal layer 31 (Ni plating layer) had a thickness of 6 μm, and the second metal layer 32 (bright Cu plating layer) had a thickness of 14 μm.

Example 6

The first metal layer 31 was a matte Cu plating layer, and the second metal layer 32 was an Fe plating layer. First, the Ti substrate was immersed in the same matte Cu plating bath as in Example 1 to form the first metal layer 31 having a thickness of 5 μm on the Ti substrate.

After the first metal layer 31 was formed on the Ti substrate, the first metal layer 31 was washed with water, and then surface roughnesses (Ra, Ry, Rz) and the like of the first metal layer 31 were measured in the same manner as in Example 1.

Subsequently, after washing with water and the like, the Ti substrate having the first metal layer 31 was immersed in an Fe plating bath described hereinafter to form the second metal layer 32 (Fe plating layer) having a thickness of 5 μm on the first metal layer 31.

[Fe Plating Condition]
  Bath composition: a known iron chloride plating bath
    Ferrous chloride: 1000 g/L
    Hydrochloric acid: 10 ml/L
  Temperature: 85° C. or higher
  pH: 1 or lower
  Stirring: jet stream stirring and air stirring
  Current density: 15 A/dm$^2$ Subsequently, the formed first metal layer 31 and second metal layer 32 were sufficiently dried, and then removed from the Ti substrate to obtain a laminated metal foil (battery current collector in this Example). Then, the resulting laminated metal foil was subjected to a tensile test to measure a mechanical strength (tensile strength) in the same manner as described hereinbefore.

Example 7

The same procedure as in Example 6 was implemented except that the first metal layer 31 (matte Cu plating layer) had a thickness of 10 μm and the second metal layer 32 (Fe plating layer) had a thickness of 10 μm.

Example 8

The same procedure as in Example 6 was implemented except that the first metal layer 31 (matte Cu plating layer) had a thickness of 5 μm and the second metal layer 32 (Fe plating layer) had a thickness of 10 μm.

Example 9

The first metal layer 31 was an Ni plating layer, and the second metal layer 32 was an Fe plating layer. First, in the same manner as in Example 5, the Ti substrate was immersed in the Ni plating bath to form the first metal layer 31 having a thickness of 3 μm. Subsequently, in the same manner as in other Examples, the surface roughness of the first metal layer 31 was measured, and then the second metal layer 32 (Fe plating layer) having a thickness of 3 μm was formed on the first metal layer 31 in the same manner as in Example 6.

Subsequently, the formed first metal layer 31 and second metal layer 32 were sufficiently dried, and then removed from the Ti substrate to obtain a laminated metal foil (battery current collector in this Example). Then, the resulting laminated metal foil was subjected to a tensile test to measure a mechanical strength (tensile strength) in the same manner as described hereinbefore.

Example 10

The same procedure as in Example 9 was implemented except that the first metal layer 31 (Ni plating layer) had a thickness of 5 μm and the second metal layer 32 (Fe plating layer) had a thickness of 5 μm.

Example 11

The same procedure as in Example 9 was implemented except that the first metal layer 31 (Ni plating layer) had a thickness of 10 μm and the second metal layer 32 (Fe plating layer) had a thickness of 10 μm.

Example 12

The layer structure was reverse to the layer structure in Example 9. That is, the same procedure as in Example 9 was implemented except that the first metal layer 31 was an Fe plating layer and the second metal layer 32 was an Ni plating layer.

Example 13

The same procedure as in Example 12 was implemented except that the first metal layer 31 (Fe plating layer) had a thickness of 5 μm and the second metal layer 32 (Ni plating layer) had a thickness of 5 μm.

Example 14

The same procedure as in Example 12 was implemented except that the first metal layer 31 (Fe plating layer) had a thickness of 10 μm and the second metal layer 32 (Ni plating layer) had a thickness of 10 μm.

Example 15

A matte Cu plating layer was selected as the first metal layer 31, an Ni plating layer was selected as the second metal layer 32, and a matte Cu plating layer was selected as the third metal layer 33.

First, in the same manner as in Example 2, the first metal layer 31 (matte Cu plating layer) having a thickness of 5 μm was formed on a Ti substrate, a surface roughness and the like were measured, and then the second metal layer 32 (Ni plating layer) having a thickness of 10 μm was formed on the first metal layer 31 in the same manner as in Example 3.

Subsequently, a surface roughness of the second metal layer 32 was measured, and then the third metal layer 33 (matte Cu plating layer) having a thickness of 5 μm was again formed on the second metal layer 32 in the same manner as in Example 2.

Then, the formed first metal layer 31 to third metal layer 33 were sufficiently dried, and then removed from the Ti substrate to obtain a laminated metal foil (battery current collector in this Example), which was subjected to a tensile test to measure a mechanical strength (tensile strength) in the same manner as described hereinbefore.

Example 16

The same procedure as in Example 15 was implemented except that the first metal layer 31 (matte Cu plating layer) had a thickness of 2.5 μm, the second metal layer 32 (Ni plating layer) had a thickness of 5 μm, and the third metal layer 33 (matte Cu plating layer) had a thickness of 2.5 μm.

Example 17

The same procedure as in Example 15 was implemented except that the first metal layer 31 (matte Cu plating layer) had a thickness of 1 μm, the second metal layer 32 (Ni plating layer) had a thickness of 2 μm, and the third metal layer 33 (matte Cu plating layer) had a thickness of 1 μm.

Example 18

The same procedure as in Example 15 was implemented except that the first metal layer 31 (matte Cu plating layer) had a thickness of 8 μm, the second metal layer 32 (Ni plating layer) had a thickness of 4 μm, and the third metal layer 33 (matte Cu plating layer) had a thickness of 8 μm.

Example 19

The same procedure as in Example 15 was implemented except that the first metal layer 31 (matte Cu plating layer) had a thickness of 4 μm, the second metal layer 32 (Ni plating layer) had a thickness of 2 μm, and the third metal layer 33 (matte Cu plating layer) had a thickness of 4 μm.

Example 20

A bright Cu plating layer was selected as the first metal layer 31, an Ni plating layer was selected as the second metal layer 32, and a bright Cu plating layer was selected as the third metal layer 33.

First, in the same manner as in Example 4, the first metal layer 31 (bright Cu plating layer) having a thickness of 5 μm was formed on a Ti substrate, a surface roughness and the like were measured, and then the second metal layer 32 (Ni plating layer) having a thickness of 10 μm was formed on the first metal layer 31 in the same manner as in Example 3.

Subsequently, a surface roughness of the second metal layer 32 was measured, and then the third metal layer 33 (bright Cu plating layer) having a thickness of 5 μm was again formed on the second metal layer 32 in the same manner as in Example 4.

Then, the formed first metal layer 31 to third metal layer 33 were sufficiently dried, and then removed from the Ti substrate to obtain a laminated metal foil (battery current collector in this Example), which was subjected to tensile test to measure a mechanical strength (tensile strength) in the same manner as described hereinbefore.

Example 21

The same procedure as in Example 20 was implemented except that the first metal layer 31 (bright Cu plating layer) had a thickness of 2.5 μm, the second metal layer 32 (Ni plating layer) had a thickness of 5 μm, and the third metal layer 33 (bright Cu plating layer) had a thickness of 2.5 μm.

Example 22

The same procedure as in Example 20 was implemented except that the first metal layer 31 (bright Cu plating layer) had a thickness of 1 μm, the second metal layer 32 (Ni plating layer) had a thickness of 2 μm, and the third metal layer 33 (bright Cu plating layer) had a thickness of 1 μm.

Example 23

The same procedure as in Example 20 was implemented except that the first metal layer 31 (bright Cu plating layer) had a thickness of 8 μm, the second metal layer 32 (Ni plating layer) had a thickness of 4 μm, and the third metal layer 33 (bright Cu plating layer) had a thickness of 8 μm.

Example 24

The same procedure as in Example 20 was implemented except that the first metal layer 31 (bright Cu plating layer) had a thickness of 4 μm, the second metal layer 32 (Ni plating layer) had a thickness of 2 μm, and the third metal layer 33 (bright Cu plating layer) had a thickness of 4 μm.

Example 25

The same procedure as in Example 20 was implemented except that the first metal layer 31 (bright Cu plating layer) had a thickness of 2 µm, the second metal layer 32 (Ni plating layer) had a thickness of 1 µm, and the third metal layer 33 (bright Cu plating layer) had a thickness of 2 µm.

Example 26

The layer structure was reverse to the layer structure in Example 25. That is, an Ni plating layer was selected as the first metal layer 31, a bright Cu plating layer was selected as the second metal layer 32, and an Ni plating layer was selected as the third metal layer 33.

First, in the same manner as in Example 4, the first metal layer 31 (Ni plating layer) having a thickness of 5 µm was formed on a Ti substrate, a surface roughness and the like were measured, and then the second metal layer 32 (bright Cu plating layer) having a thickness of 10 µm was formed on the first metal layer 31 in the same manner as in Example 4.

Subsequently, a surface roughness of the second metal layer 32 was measured, and then the third metal layer 33 (Ni plating layer) having a thickness of 5 µm was again formed on the second metal layer 32 in the same manner as in Example 4.

Then, the formed first metal layer 31 to third metal layer 33 were sufficiently dried, and then removed from the Ti substrate to obtain a laminated metal foil (battery current collector in this Example), which was subjected to a tensile test to measure a mechanical strength (tensile strength) in the same manner as described hereinbefore.

Incidentally, at this time, the roughness Rz of the laminate interface between the second metal layer 32 and the third metal layer 33 was 0.401. Thus, 0.401 was rounded off to 3 decimal places to obtain 0.4 as the minimum value of Rz in the present invention, which derived Rz≥0.4.

Example 27

The same procedure as in Example 26 was implemented except that the first metal layer 31 (Ni plating layer) had a thickness of 1 µm, the second metal layer 32 (bright Cu plating layer) had a thickness of 8 µm, and the third metal layer 33 (Ni plating layer) had a thickness of 1 µm.

Example 28

A matte Cu plating layer was selected as the first metal layer 31, an Fe plating layer was selected as the second metal layer 32, and a matte Cu plating layer was selected as the third metal layer 33.

First, in the same manner as in Example 6, the first metal layer 31 (matte Cu plating layer) having a thickness of 5 µm was formed on a Ti substrate, a surface roughness and the like were measured, and then the second metal layer 32 (Fe plating layer) having a thickness of 10 µm was formed on the first metal layer 31 in the same manner as in Example 7.

Subsequently, a surface roughness of the second metal layer 32 was measured, and then the third metal layer 33 (matte Cu plating layer) having a thickness of 5 µm was again formed on the second metal layer 32 in the same manner as in Example 6.

Then, the formed first metal layer 31 to third metal layer 33 were sufficiently dried, and then removed from the Ti substrate to obtain a laminated metal foil (battery current collector in this Example), which was subjected to a tensile test to measure a mechanical strength (tensile strength) in the same manner as described hereinbefore.

Example 29

The same procedure as in Example 28 was implemented except that the first metal layer 31 (matte Cu plating layer) had a thickness of 2.5 µm, the second metal layer 32 (Fe plating layer) had a thickness of 5 µm, and the third metal layer 33 (matte Cu plating layer) had a thickness of 2.5 µm.

Example 30

The same procedure as in Example 28 was implemented except that the first metal layer 31 (matte Cu plating layer) had a thickness of 1.5 µm, the second metal layer 32 (Fe plating layer) had a thickness of 7 µm, and the third metal layer 33 (matte Cu plating layer) had a thickness of 1.5 µm.

Example 31

An Ni plating layer was selected as the first metal layer 31, an Fe plating layer was selected as the second metal layer 32, and an Ni plating layer was selected as the third metal layer 33.

First, in the same manner as in Example 10, the first metal layer 31 (Ni plating layer) having a thickness of 5 µm was formed on a Ti substrate, a surface roughness and the like were measured, and then the second metal layer 32 (Fe plating layer) having a thickness of 10 µm was formed on the first metal layer 31 in the same manner as in Example 11.

Subsequently, a surface roughness of the second metal layer 32 was measured, and then the third metal layer 33 (Ni plating layer) having a thickness of 5 µm was again formed on the second metal layer 32 in the same manner as in Example 10.

Then, the formed first metal layer 31 to third metal layer 33 were sufficiently dried, and then removed from the Ti substrate to obtain a laminated metal foil (battery current collector in this Example), which was subjected to a tensile test to measure a mechanical strength (tensile strength) in the same manner as described hereinbefore.

Example 32

The same procedure as in Example 31 was implemented except that the first metal layer 31 (Ni plating layer) had a thickness of 2.5 µm, the second metal layer 32 (Fe plating layer) had a thickness of 5 µm, and the third metal layer 33 (Ni plating layer) had a thickness of 2.5 µm.

Example 33

The same procedure as in Example 31 was implemented except that the first metal layer 31 (Ni plating layer) had a thickness of 1.5 µm, the second metal layer 32 (Fe plating layer) had a thickness of 7 µm, and the third metal layer 33 (Ni plating layer) had a thickness of 1.5 µm.

Example 34

A matte Cu plating layer was selected as the first metal layer 31, an Ni plating layer was selected as the second metal layer 32, a matte Cu plating layer was selected as the third metal layer 33, an Ni plating layer was selected as the fourth metal layer 34, and a matte Cu plating layer was selected as the fifth metal layer 35. In other words, in this Example, the Cu plating layer and the Ni plating layer are alternately laminated from the first metal layer 31 to the fifth metal layer 35.

First, in the same manner as in Example 2, the first metal layer 31 (matte Cu plating layer) having a thickness of 4 μm was formed on a Ti substrate, a surface roughness and the like were measured, and then the second metal layer 32 (Ni plating layer) having a thickness of 4 μm was formed on the first metal layer 31 in the same manner as in Example 3.

Subsequently, a surface roughness of the second metal layer 32 was measured, and then the third metal layer 33 (matte Cu plating layer) having a thickness of 4 μm was again formed on the second metal layer 32 in the same manner as in Example 2.

Subsequently, a surface roughness of the third metal layer 33 was measured, and then the fourth metal layer 34 (Ni plating layer) having a thickness of 4 μm was again formed on the third metal layer 33 in the same manner as in Example 3.

Subsequently, a surface roughness of the fourth metal layer 34 was measured, and then the fifth metal layer 35 (matte Cu plating layer) having a thickness of 4 μm was again formed on the fourth metal layer 34 in the same manner as in Example 2.

Then, the formed first metal layer 31 to fifth metal layer 35 were sufficiently dried, and then removed from the Ti substrate to obtain a laminated metal foil (battery current collector in this Example), which was subjected to a tensile test to measure a mechanical strength (tensile strength) in the same manner as described hereinbefore.

Example 35

The same procedure as in Example 34 was implemented except that the first metal layer 31 (matte Cu plating layer) had a thickness of 2 μm, the second metal layer 32 (Ni plating layer) had a thickness of 2 μm, the third metal layer 33 (matte Cu plating layer) had a thickness of 2 μm, the fourth metal layer 34 (Ni plating layer) had a thickness of 2 μm, and the fifth metal layer 35 (matte Cu plating layer) had a thickness of 2 μm.

Example 36

A bright Cu plating layer was selected as the first metal layer 31, an Ni plating layer was selected as the second metal layer 32, a bright Cu plating layer was selected as the third metal layer 33, an Ni plating layer was selected as the fourth metal layer 34, and a bright Cu plating layer was selected as the fifth metal layer 35.

That is, the same procedure as in Example 34 was implemented except that the first metal layer 31 was a bright Cu plating layer, the third metal layer 33 was a bright Cu plating layer, and the fifth metal layer 35 was a bright Cu plating layer.

Incidentally, at this time, the roughness Ry of the laminate interface between the third metal layer 33 and the fourth metal layer 34 was 0.096. Thus, 0.096 was rounded off to 3 decimal places to obtain 0.1 as the minimum value of Ry in the present invention, which derived Ry≥0.1.

Example 37

An Ni plating layer was selected as the first metal layer 31, an Fe plating layer was selected as the second metal layer 32, an Ni plating layer was selected as the third metal layer 33, an Fe plating layer was selected as the fourth metal layer 34, and an Ni plating layer was selected as the fifth metal layer 35. In other words, in this Example, the Ni plating layer and the Fe plating layer are alternately laminated from the first metal layer 31 to the fifth metal layer 35.

First, in the same manner as in Example 31, the first metal layer 31 (Ni plating layer) having a thickness of 4 μm was formed on a Ti substrate, a surface roughness and the like were measured, and then the second metal layer 32 (Fe plating layer) having a thickness of 4 μm was formed on the first metal layer 31.

Subsequently, a surface roughness of the second metal layer 32 was measured, and then the third metal layer 33 (Ni plating layer) having a thickness of 4 μm was again formed on the second metal layer 32 in the same manner as in Example 31. Subsequently, a surface roughness of the third metal layer 33 was measured, and then the fourth metal layer 34 (Fe plating layer) having a thickness of 4 μm was formed on the third metal layer 33.

Subsequently, a surface roughness of the fourth metal layer 34 was measured, and then the fifth metal layer 35 (Ni plating layer) having a thickness of 4 μm was formed on the fourth metal layer 34.

Then, the formed first metal layer 31 to fifth metal layer 35 were sufficiently dried, and then removed from the Ti substrate to obtain a laminated metal foil (battery current collector in this Example), which was subjected to a tensile test to measure a mechanical strength (tensile strength) in the same manner as described hereinbefore.

Comparative Example 1

The same procedure as in Example 4 was implemented except that the first metal layer 31 (bright Cu plating layer) had a thickness of 5 μm, the second metal layer 32 (Ni plating layer) had a thickness of 5 μm, and the amount of the brightener to be added was adjusted.

At this time, a surface roughness of the first metal layer 31 on the side facing the second metal layer 32 (i.e. a roughness of the laminate interface between the first metal layer 31 and the second metal layer 32) was Ra=0.098.

Comparative Example 2

The same procedure as in Comparative Example 1 was implemented except that the first metal layer 31 (bright Cu plating layer) had a thickness of 10 μm, the second metal layer 32 (Ni plating layer) had a thickness of 10 μm, and the amount of the brightener to be added was adjusted.

At this time, a surface roughness of the first metal layer 31 on the side facing the second metal layer 32 (i.e. a roughness of the laminate interface between the first metal layer 31 and the second metal layer 32) was Ra=0.033.

Comparative Example 3

The same procedure as in Comparative Example 1 was implemented except that the first metal layer 31 (bright Cu plating layer) had a thickness of 6 μm, the second metal layer 32 (Ni plating layer) had a thickness of 4 μm, and the amount of the brightener to be added was adjusted.

At this time, a surface roughness of the first metal layer 31 on the side facing the second metal layer 32 (i.e. a roughness of the laminate interface between the first metal layer 31 and the second metal layer 32) was Ra=0.075.

Comparative Example 4

The same procedure as in Comparative Example 1 was implemented except that the first metal layer 31 (bright Cu plating layer) had a thickness of 14 µm, the second metal layer 32 (Ni plating layer) had a thickness of 6 µm, and the amount of the brightener to be added was adjusted.

At this time, a surface roughness of the first metal layer 31 on the side facing the second metal layer 32 (i.e. a roughness of the laminate interface between the first metal layer 31 and the second metal layer 32) was Ra=0.028.

Comparative Example 5

The same procedure as in Comparative Example 1 was implemented except that the first metal layer 31 (bright Cu plating layer) had a thickness of 5 µm, and the second metal layer 32 (Ni plating layer) had a thickness of 10 µm.

At this time, a surface roughness of the first metal layer 31 on the side facing the second metal layer 32 (i.e. a roughness of the laminate interface between the first metal layer 31 and the second metal layer 32) was Ra=0.098.

Comparative Example 6

A bright Cu plating laver was selected as the first metal layer 31, and an Fe plating layer was selected as the second metal layer 32.

First, the first metal layer 31 (bright Cu plating layer) having a thickness of 5 µm was formed on a Ti substrate, and a surface roughness and the like were measured in the same manner as in Example 20 except that the amount of the brightener to be added was adjusted, and then, the second metal layer 32 (Fe plating layer) having a thickness of 5 µm was formed on the first metal layer 31 in the same manner as in Example 10 similarly except that the amount of the brightener to be added was adjusted.

Then, the formed first metal layer 31 and second metal layer 32 were sufficiently dried, and then removed from the Ti substrate to obtain a current collector, which was subjected to a tensile test to measure a mechanical strength (tensile strength) in the same manner as described hereinbefore.

Comparative Example 7

The same procedure as in Comparative Example 7 was implemented except that the first metal layer 31 (bright Cu plating layer) had a thickness of 10 µm, the second metal layer 32 (Fe plating layer) had a thickness of 10 µm, and an amount of the brightener to be added was adjusted.

Comparative Example 8

The same procedure as in Comparative Example 7 was implemented except that the second metal layer 32 (Fe plating layer) had a thickness of 10 µm.

Comparative Example 9

The same procedure as in Comparative Example 7 was implemented except that the first metal layer 31 (bright Cu plating layer) had a thickness of 8 µm, the second metal layer 32 (Fe plating layer) had a thickness of 4 µm, and an amount of the brightener to be added was adjusted.

Comparative Example 10

A bright Ni was selected as the first metal layer 31, and a bright Cu was selected as the second metal layer 32.

More specifically, first, a known Ti substrate was used as a substrate on which the current collector is formed, and the Ti substrate was subjected to a known pretreatment such as pickling and water washing.

Next, the pretreated Ti substrate was immersed in a bright Ni plating bath described hereinafter, and the first metal layer 31 (bright Ni plating layer) having a thickness of 10 µm as an electrolytic foil was formed on the Ti substrate.

[Bright Ni Plating Condition]
Bath composition: appropriate amounts of the following additives were added to a nickel sulfamate bath.
Nickel sulfamate: 300 g/L
Nickel chloride: 10 g/L
Boric acid: 20 g/L
Temperature: 50° C.
pH: 4
Stirring: air stirring
Current density: 20 A/dm$^2$
Additive: 5 to 15 ml/L of brightener for nickel plating After the first metal layer 31 was formed on the Ti substrate and washed with water, surface roughnesses (Ra, Ry, Rz) and the like of the first metal layer 31 were measured in the same manner as described hereinbefore.

Subsequently, the Ti substrate having the first metal layer 31 was immersed in the same bright Cu plating bath as in Comparative Example 8 to form a second metal layer 32 (bright Cu plating layer) having a thickness of 10 µm on the first metal layer 31.

Subsequently, the electrodeposited first metal layer 31 and second metal layer 32 were sufficiently dried, and then removed from the Ti substrate to obtain a laminated metal foil (battery current collector). Then, the resulting laminated metal foil was subjected to a tensile test to measure a mechanical strength (tensile strength) in the same manner as described hereinbefore.

At this time, a surface roughness of the first metal layer 31 on the side facing the second metal layer 32 (i.e. a roughness of the laminate interface between the first metal layer 31 and the second metal layer 32) was Ra=0.057.

Comparative Example 11

The same procedure as in Comparative Example 10 was implemented except that the second metal layer 32 was a matte Cu plating layer.

At this time, a surface roughness of the first metal layer 31 on the side facing the second metal layer 32 (i.e. a roughness of the laminate interface between the first metal layer 31 and the second metal layer 32) was Ra=0.057.

Comparative Example 12

The same procedure as in Comparative Example 20 was implemented except that a bright Ni plating layer having a thickness of 10 µm was formed as the second metal layer 32 in accordance with the bright Ni plating condition described in Comparative Example 10.

At this time, a surface roughness of the first metal layer 31 on the side facing the second metal layer 32 (i.e. a roughness of the laminate interface between the first metal layer 31 and the second metal layer 32) was Ra=0.098, and similarly a surface roughness of the second metal layer 32 on the side facing the third metal layer 33 was Ra=0.062.

Comparative Example 13

The same procedure as in Example 26 was implemented except that bright Ni plating layers respectively having a thicknesses of 5 μm were formed as the first metal layer 31 and the third metal layer 33 in accordance with the bright Ni plating condition described in Comparative Example 10.

At this time, a surface roughness of the first metal layer 31 on the side facing the second metal layer 32 (i.e. a roughness of the laminate interface between the first metal layer 31 and the second metal layer 32) was Ra=0.102, and similarly a surface roughness of the second metal layer 32 on the side facing the third metal layer 33 was Ra=0.007.

[Evaluation of Practicality]

For the current collectors obtained in Examples and Comparative Examples described hereinbefore, evaluation indices were set as described hereinafter, and current collectors having measured tensile strengths of 105% or higher of the theoretical strength were judged as "practical" from the viewpoint of availability for next-generation batteries or the like.

<<Evaluation Index

Good: Tensile strength is 105% or higher of the theoretical strength

Bad: Tensile strength is lower than 105% of the theoretical strength

Table 6 to Table 10 depict specification values, roughnesses of the laminate interfaces, mechanical properties, and practical evaluation results related to Examples and Comparative Examples explained hereinbefore.

TABLE 6

| Examples/ Comparative Examples | Total foil thickness [μm] | Layer constitution (thickness [μm]) First metal layer | Layer constitution (thickness [μm]) Second metal layer | Cu ratio | Ni ratio | Mechanical property Tensile strength [MPa] | Mechanical property Theoretical strength [MPa] | Mechanical property Theoretical strength ratio | Interface between first metal layer/second metal layer Ra [μm] | Interface between first metal layer/second metal layer Ry [μm] | Interface between first metal layer/second metal layer Rz [μm] | Surface area [μm²] | Ra/Ry | Ra/Rz | Practical evaluation |
|---|---|---|---|---|---|---|---|---|---|---|---|---|---|---|---|
| Example 1 | 4 | Cu (2) | Ni (2) | 50% | 50% | 487 | 431 | 1.129 | 0.202 | 2.870 | 3.010 | 11089 | 0.07 | 0.07 | ○ |
| Example 2 | 10 | Cu (5) | Ni (5) | 50% | 50% | 528 | 470 | 1.125 | 0.338 | 6.000 | 4.500 | 16534 | 0.06 | 0.08 | ○ |
| Example 3 | 20 | Cu (10) | Ni (10) | 50% | 50% | 554 | 504 | 1.099 | 0.662 | 8.305 | 8.152 | 15646 | 0.08 | 0.08 | ○ |
| Example 4 | 4 | B-Cu (2) | Ni (2) | 50% | 50% | 511 | 466 | 1.097 | 0.165 | 1.499 | 1.525 | 10062 | 0.11 | 0.11 | ○ |
| Example 5 | 20 | Ni (6) | B-Cu (14) | 70% | 30% | 629 | 463 | 1.359 | 0.126 | 1.340 | 1.027 | 10120 | 0.09 | 0.12 | ○ |
| Example 6 | 10 | Cu (5) | Fe (5) | 50% | / | 357 | 330 | 1.081 | 0.338 | 6.000 | 4.500 | 16534 | 0.06 | 0.08 | ○ |
| Example 7 | 20 | Cu (10) | Fe (10) | 50% | / | 372 | 340 | 1.093 | 0.662 | 8.305 | 8.152 | 15646 | 0.08 | 0.08 | ○ |
| Example 8 | 15 | Cu (5) | Fe (10) | 33% | / | 405 | 366 | 1.107 | 0.338 | 6.000 | 4.500 | 16534 | 0.06 | 0.08 | ○ |
| Example 9 | 6 | Ni (3) | Fe (3) | / | 50% | 564 | 520 | 1.086 | 0.189 | 2.458 | 2.010 | 10724 | 0.08 | 0.09 | ○ |
| Example 10 | 10 | Ni (5) | Fe (5) | / | 50% | 602 | 548 | 1.100 | 0.137 | 2.117 | 1.896 | 10307 | 0.06 | 0.07 | ○ |
| Example 11 | 20 | Ni (10) | Fe (10) | / | 50% | 637 | 580 | 1.098 | 0.187 | 2.155 | 2.056 | 10174 | 0.09 | 0.09 | ○ |
| Example 12 | 6 | Fe (3) | Ni (3) | / | 50% | 574 | 520 | 1.105 | 0.326 | 3.250 | 3.662 | 11101 | 0.10 | 0.09 | ○ |
| Example 13 | 10 | Fe (5) | Ni (5) | / | 50% | 614 | 548 | 1.121 | 0.421 | 6.240 | 5.624 | 13999 | 0.07 | 0.07 | ○ |
| Example 14 | 20 | Fe (10) | Ni (10) | / | 50% | 648 | 580 | 1.116 | 0.999 | 9.764 | 9.436 | 19054 | 0.10 | 0.11 | ○ |
| Comparative Example 1 | 10 | B-Cu (5) | Ni (5) | 50% | 50% | 538 | 513 | 1.049 | 0.098 | 1.455 | 1.363 | 10040 | 0.07 | 0.07 | × |
| Comparative Example 2 | 20 | B-Cu (10) | Ni (10) | 50% | 50% | 551 | 543 | 1.014 | 0.033 | 0.382 | 0.332 | 10007 | 0.09 | 0.10 | × |
| Comparative Example 3 | 10 | B-Cu (6) | Ni (4) | 60% | 40% | 501 | 478 | 1.048 | 0.075 | 0.995 | 0.867 | 10068 | 0.08 | 0.09 | × |
| Comparative Example 4 | 20 | B-Cu (14) | Ni (6) | 70% | 30% | 480 | 463 | 1.036 | 0.028 | 0.350 | 0.278 | 10005 | 0.08 | 0.10 | × |
| Comparative Example 5 | 15 | B-Cu (5) | Ni (10) | 33% | 67% | 626 | 610 | 1.026 | 0.098 | 1.455 | 1.363 | 10040 | 0.07 | 0.07 | × |
| Comparative Example 6 | 10 | B-Cu (5) | Fe (5) | 50% | / | 324 | 373 | 0.868 | 0.098 | 1.455 | 1.363 | 10040 | 0.07 | 0.07 | × |
| Comparative Example 7 | 20 | B-Cu (10) | Fe (10) | 50% | / | 352 | 380 | 0.926 | 0.033 | 0.382 | 0.332 | 10007 | 0.09 | 0.10 | × |
| Comparative Example 8 | 15 | B-Cu (5) | Fe (10) | 33% | / | 370 | 392 | 0.943 | 0.098 | 1.455 | 1.363 | 10040 | 0.07 | 0.07 | × |
| Comparative Example 9 | 12 | B-Cu (8) | Fe (4) | 67% | / | 307 | 362 | 0.848 | 0.056 | 0.679 | 0.490 | 10096 | 0.08 | 0.11 | × |
| Comparative Example 10 | 20 | B-Ni (10) | B-Cu (10) | 50% | 50% | 533 | 516 | 1.032 | 0.057 | 0.723 | 0.698 | 10027 | 0.08 | 0.08 | × |
| Comparative Example 11 | 20 | B-Ni (10) | Cu (10) | 50% | 50% | 477 | 476 | 1.001 | 0.057 | 0.723 | 0.698 | 10027 | 0.08 | 0.08 | × |

"Cu": Matte Cu
"Ni": Matte Ni
"B-Cu": Bright B-Cu
"B-Ni": Bright Ni

TABLE 7

| Examples/ Comparative Examples | Total foil thickness [μm] | Layer constitution (thickness [μm]) | | | Cu ratio | Ni ratio | Mechanical property | | | Practical evaluation |
|---|---|---|---|---|---|---|---|---|---|---|
| | | First metal layer | Second metal layer | Third metal layer | | | Tensile strength [MPa] | Theoretical strength [MPa] | Theoretical strength ratio | |
| Example 15 | 20 | Cu (5) | Ni (10) | Cu (5) | 50% | 50% | 559 | 504 | 1.109 | ○ |
| Example 16 | 10 | Cu (2.5) | Ni (5) | Cu (2.5) | 50% | 50% | 579 | 470 | 1.233 | ○ |
| Example 17 | 4 | Cu (1) | Ni (2) | Cu (1) | 50% | 50% | 492 | 431 | 1.141 | ○ |
| Example 18 | 20 | Cu (8) | Ni (4) | Cu (8) | 80% | 20% | 424 | 360 | 1.178 | ○ |
| Example 19 | 10 | Cu (4) | Ni (2) | Cu (4) | 80% | 20% | 374 | 339 | 1.102 | ○ |
| Example 20 | 20 | B-Cu (5) | Ni (10) | B-Cu (5) | 50% | 50% | 690 | 543 | 1.269 | ○ |
| Example 21 | 10 | B-Cu (2.5) | Ni (5) | B-Cu (2.5) | 50% | 50% | 574 | 513 | 1.119 | ○ |
| Example 22 | 4 | B-Cu (1) | Ni (2) | B-Cu (1) | 50% | 50% | 539 | 466 | 1.157 | ○ |
| Example 23 | 20 | B-Cu (8) | Ni (4) | B-Cu (8) | 80% | 20% | 562 | 423 | 1.327 | ○ |
| Example 24 | 10 | B-Cu (4) | Ni (2) | B-Cu (4) | 80% | 20% | 449 | 409 | 1.099 | ○ |
| Example 25 | 5 | B-Cu (2) | Ni (1) | B-Cu (2) | 80% | 20% | 439 | 385 | 1.140 | ○ |
| Example 26 | 20 | Ni (5) | B-Cu (10) | Ni (5) | 50% | 50% | 660 | 543 | 1.214 | ○ |
| Example 27 | 10 | Ni (1) | B-Cu (8) | Ni (1) | 80% | 20% | 461 | 409 | 1.128 | ○ |
| Example 28 | 20 | Cu (5) | Fe (10) | Cu (5) | 50% | / | 379 | 340 | 1.113 | ○ |
| Example 29 | 10 | Cu (2.5) | Fe (5) | Cu (2.5) | 50% | / | 359 | 330 | 1.087 | ○ |
| Example 30 | 10 | Cu (1.5) | Fe (7) | Cu (1.5) | 30% | / | 420 | 361 | 1.163 | ○ |
| Example 31 | 20 | Ni (5) | Fe (10) | Ni (5) | / | 50% | 631 | 580 | 1.087 | ○ |
| Example 32 | 10 | Ni (2.5) | Fe (5) | Ni (2.5) | / | 50% | 602 | 548 | 1.100 | ○ |
| Example 33 | 10 | Ni (1.5) | Fe (7) | Ni (1.5) | / | 30% | 548 | 492 | 1.115 | ○ |
| Comparative Example 12 | 20 | B-Cu (5) | B-Ni (10) | B-Cu (5) | 50% | 50% | 475 | 516 | 0.921 | × |
| Comparative Example 13 | 20 | B-Ni (5) | B-Cu (10) | B-Ni (5) | 50% | 50% | 503 | 516 | 0.975 | × |

"Cu": Matte Cu
"Ni": Matte Ni
"B-Cu": Bright B-Cu
"B-Ni": Bright Ni

TABLE 8

| Examples/ Comparative Examples | Total thickness [μm] | Interface between first metal layer/ second metal layer | | | | | | Interface between second metal layer/ third metal layer | | | | | |
|---|---|---|---|---|---|---|---|---|---|---|---|---|---|
| | | Ra [μm] | Ry [μm] | Rz [μm] | Surface area [μm²] | Ra/ Ry | Ra/ Rz | Ra [μm] | Ry [μm] | Rz [μm] | Surface area [μm²] | Ra/ Ry | Ra/ Rz |
| Example 15 | 20 | 0.338 | 6.000 | 4.500 | 16534 | 0.06 | 0.08 | 0.389 | 3.512 | 3.402 | 10625 | 0.11 | 0.11 |
| Example 16 | 10 | 0.210 | 2.790 | 3.110 | 11102 | 0.08 | 0.07 | 0.270 | 2.770 | 3.050 | 11097 | 0.10 | 0.09 |
| Example 17 | 4 | 0.222 | 2.970 | 3.230 | 11111 | 0.07 | 0.07 | 0.246 | 2.480 | 2.890 | 10998 | 0.10 | 0.08 |
| Example 18 | 20 | 0.629 | 7.758 | 7.554 | 15184 | 0.08 | 0.08 | 0.425 | 4.845 | 4.474 | 11468 | 0.09 | 0.10 |
| Example 19 | 10 | 0.320 | 3.890 | 3.762 | 11984 | 0.08 | 0.08 | 0.320 | 2.870 | 3.090 | 12030 | 0.12 | 0.10 |
| Example 20 | 20 | 0.098 | 1.455 | 1.363 | 10040 | 0.07 | 0.07 | 0.199 | 2.023 | 1.768 | 10349 | 0.10 | 0.11 |
| Example 21 | 10 | 0.165 | 1.499 | 1.525 | 10062 | 0.11 | 0.11 | 0.199 | 2.048 | 1.765 | 10358 | 0.10 | 0.11 |
| Example 22 | 4 | 0.166 | 1.521 | 1.535 | 10068 | 0.11 | 0.11 | 0.168 | 1.789 | 1.468 | 10278 | 0.09 | 0.11 |
| Example 23 | 20 | 0.056 | 0.679 | 0.490 | 10096 | 0.08 | 0.11 | 0.124 | 1.182 | 1.128 | 10151 | 0.11 | 0.11 |
| Example 24 | 10 | 0.125 | 1.288 | 1.015 | 10040 | 0.10 | 0.12 | 0.179 | 1.746 | 1.825 | 10224 | 0.10 | 0.10 |
| Example 25 | 5 | 0.165 | 1.499 | 1.525 | 10062 | 0.11 | 0.11 | 0.259 | 2.158 | 2.150 | 10587 | 0.12 | 0.12 |
| Example 26 | 20 | 0.189 | 1.588 | 1.624 | 10078 | 0.12 | 0.12 | 0.043 | 0.432 | 0.401 | 10032 | 0.10 | 0.11 |
| Example 27 | 10 | 0.179 | 1.848 | 1.632 | 10085 | 0.11 | 0.11 | 0.049 | 0.615 | 0.437 | 10071 | 0.08 | 0.11 |
| Example 28 | 20 | 0.338 | 6.000 | 4.500 | 16534 | 0.06 | 0.08 | 0.619 | 7.526 | 7.214 | 15111 | 0.08 | 0.09 |
| Example 23 | 10 | 0.210 | 2.790 | 3.110 | 11102 | 0.08 | 0.07 | 0.441 | 6.185 | 5.812 | 14001 | 0.07 | 0.08 |
| Example 30 | 10 | 0.220 | 2.890 | 3.198 | 11117 | 0.08 | 0.07 | 0.452 | 6.794 | 6.114 | 14263 | 0.07 | 0.07 |
| Example 31 | 20 | 0.137 | 2.117 | 1.896 | 10307 | 0.06 | 0.07 | 0.589 | 8.444 | 8.014 | 15206 | 0.07 | 0.07 |
| Example 32 | 10 | 0.184 | 2.354 | 1.945 | 10821 | 0.08 | 0.09 | 0.439 | 6.115 | 5.720 | 13994 | 0.07 | 0.08 |
| Example 33 | 10 | 0.125 | 1.987 | 1.880 | 10589 | 0.06 | 0.07 | 0.459 | 6.824 | 6.254 | 14263 | 0.07 | 0.07 |
| Comparative Example 12 | 20 | 0.098 | 1.455 | 1.363 | 10040 | 0.07 | 0.07 | 0.062 | 0.895 | 0.882 | 10031 | 0.07 | 0.07 |
| Comparative Example 13 | 20 | 0.102 | 1.324 | 1.453 | 10052 | 0.08 | 0.07 | 0.007 | 0.865 | 0.912 | 10033 | 0.01 | 0.01 |

| Examples/ Comparative Examples | Average data of all interfaces | | | | | | Highest value among all interfaces | | | | | |
|---|---|---|---|---|---|---|---|---|---|---|---|---|
| | Ra [μm] | Ry [μm] | Rz [μm] | Surface area [μm²] | Ra/ Ry | Ra/ Rz | Ra [μm] | Ry [μm] | Rz [μm] | Surface area [μm²] | Ra/ Ry | Ra/ Rz |
| Example 15 | 0.364 | 4.756 | 3.951 | 13580 | 0.08 | 0.09 | 0.389 | 6.000 | 4.500 | 16534 | 0.06 | 0.09 |
| Example 16 | 0.240 | 2.780 | 3.080 | 11100 | 0.09 | 0.08 | 0.270 | 2.790 | 3.110 | 11102 | 0.10 | 0.09 |

TABLE 8-continued

| | | | | | | | | | | | | |
|---|---|---|---|---|---|---|---|---|---|---|---|---|
| Example 17 | 0.234 | 2.725 | 3.060 | 11055 | 0.09 | 0.08 | 0.246 | 2.970 | 3.230 | 11111 | 0.06 | 0.08 |
| Example 18 | 0.527 | 6.300 | 6.014 | 13326 | 0.08 | 0.09 | 0.629 | 7.756 | 7.554 | 15184 | 0.08 | 0.08 |
| Example 19 | 0.320 | 3.280 | 3.426 | 12007 | 0.10 | 0.09 | 0.320 | 3.890 | 3.762 | 12030 | 0.08 | 0.09 |
| Example 20 | 0.148 | 1.739 | 1.566 | 10194 | 0.09 | 0.09 | 0.199 | 2.023 | 1.768 | 10349 | 0.10 | 0.11 |
| Example 21 | 0.182 | 1.773 | 1.645 | 10210 | 0.10 | 0.11 | 0.199 | 2.048 | 1.765 | 10358 | 0.10 | 0.11 |
| Example 22 | 0.167 | 1.655 | 1.502 | 10172 | 0.10 | 0.11 | 0.168 | 1.789 | 1.535 | 10278 | 0.09 | 0.11 |
| Example 23 | 0.090 | 0.931 | 0.809 | 10123 | 0.10 | 0.11 | 0.124 | 1.182 | 1.128 | 10151 | 0.11 | 0.11 |
| Example 24 | 0.152 | 1.517 | 1.420 | 10132 | 0.10 | 0.11 | 0.179 | 1.746 | 1.825 | 10224 | 0.10 | 0.10 |
| Example 25 | 0.212 | 1.828 | 1.837 | 10325 | 0.12 | 0.12 | 0.259 | 2.158 | 2.150 | 10587 | 0.12 | 0.12 |
| Example 26 | 0.116 | 1.015 | 1.013 | 10055 | 0.11 | 0.11 | 0.189 | 1.598 | 1.624 | 10078 | 0.12 | 0.12 |
| Example 27 | 0.114 | 1.132 | 1.034 | 10068 | 0.10 | 0.11 | 0.179 | 1.648 | 1.632 | 10071 | 0.11 | 0.11 |
| Example 28 | 0.478 | 6.763 | 5.857 | 15623 | 0.07 | 0.08 | 0.619 | 7.526 | 7.214 | 16534 | 0.08 | 0.09 |
| Example 29 | 0.326 | 4.488 | 4.461 | 12552 | 0.07 | 0.07 | 0.441 | 6.185 | 5.812 | 14001 | 0.07 | 0.08 |
| Example 30 | 0.336 | 4.742 | 4.656 | 12690 | 0.07 | 0.07 | 0.452 | 6.794 | 6.114 | 14263 | 0.07 | 0.07 |
| Example 31 | 0.363 | 5.281 | 4.955 | 12756 | 0.07 | 0.07 | 0.589 | 8.444 | 8.014 | 15206 | 0.07 | 0.07 |
| Example 32 | 0.312 | 4.235 | 3.833 | 12308 | 0.07 | 0.08 | 0.439 | 6.115 | 5.720 | 13994 | 0.07 | 0.08 |
| Example 33 | 0.292 | 4.406 | 4.067 | 12416 | 0.07 | 0.07 | 0.459 | 6.824 | 6.254 | 14263 | 0.07 | 0.07 |
| Comparative Example 12 | 0.080 | 1.175 | 1.123 | 10035 | 0.07 | 0.07 | 0.098 | 1.455 | 1.363 | 10040 | 0.07 | 0.07 |
| Comparative Example 13 | 0.054 | 1.095 | 1.183 | 10043 | 0.05 | 0.05 | 0.102 | 1.324 | 1.453 | 10052 | 0.08 | 0.07 |

TABLE 9

| | Total | Layer constitution (thickness [μm]) | | | | | | | Mechanical property | | | |
|---|---|---|---|---|---|---|---|---|---|---|---|---|
| Examples/ Comparative Examples | thickness [μm] | First metal layer | Second metal layer | Third metal layer | Fourth metal layer | Fifth metal layer | Cu ratio | Ni ratio | Tensile strength [MPa] | Theoretical strength [MPa] | Theoretical strength ratio | Practical evaluation |
| Example 34 | 20 | Cu (4) | Ni (4) | Cu (4) | Ni (4) | Cu (4) | 60% | 40% | 560 | 458 | 1.229 | ○ |
| Example 35 | 10 | Cu (2) | Ni (2) | Cu (2) | Ni (2) | Cu (2) | 80% | 40% | 532 | 426 | 1.249 | ○ |
| Example 36 | 20 | B-Cu (4) | Ni (4) | B-Cu (4) | Ni (4) | B-Cu (4) | 60% | 40% | 684 | 503 | 1.359 | ○ |
| Example 37 | 20 | Ni (4) | Fe (4) | Ni (4) | Fe (4) | Ni (4) | / | 60% | 648 | 613 | 1.057 | ○ |

| | Interface between first layer/second layer (in the case of single layer material, the surface was measured) | | | | | | Interface between second layer/third layer | | | | | |
|---|---|---|---|---|---|---|---|---|---|---|---|---|
| Examples/ Comparative Examples | Ra [μm] | Ry [μm] | Rz [μm] | Surface area [μm²] | Ra/ Ry | Ra/ Rz | Ra [μm] | Ry [μm] | Rz [μm] | Surface area [μm²] | Ra/ Ry | Ra/ Rz |
| Example 34 | 0.320 | 3.890 | 3.762 | 11984 | 0.08 | 0.08 | 0.300 | 3.210 | 3.070 | 11910 | 0.09 | 0.10 |
| Example 35 | 0.202 | 2.870 | 3.010 | 11089 | 0.07 | 0.07 | 0.250 | 2.440 | 2.770 | 10914 | 0.10 | 0.09 |
| Example 36 | 0.125 | 1.288 | 1.015 | 10040 | 0.10 | 0.12 | 0.198 | 1.892 | 1.977 | 10295 | 0.10 | 0.10 |
| Example 37 | 0.156 | 2.150 | 1.930 | 10420 | 0.07 | 0.08 | 0.366 | 3.850 | 3.892 | 11901 | 0.10 | 0.09 |

"Cu": Matte Cu
"B-Cu": Bright B-Cu

TABLE 10

| | Total | Interface between third layer/fourth layer | | | | | | Interface between fourth layer/fifth layer | | | | | |
|---|---|---|---|---|---|---|---|---|---|---|---|---|
| Examples/ Comparative Examples | thickness [μm] | Ra [μm] | Ry [μm] | Rz [μm] | Surface area [μm²] | Ra/ Ry | Ra/ Rz | Ra [μm] | Ry [μm] | Rz [μm] | Surface area [μm²] | Ra/ Ry | Ra/ Rz |
| Example 34 | 20 | 0.338 | 3.586 | 3.295 | 11759 | 0.09 | 0.10 | 0.236 | 2.456 | 2.364 | 10601 | 0.10 | 0.10 |
| Example 35 | 10 | 0.310 | 3.180 | 3.270 | 11215 | 0.10 | 0.09 | 0.220 | 2.110 | 2.640 | 10895 | 0.10 | 0.08 |
| Example 36 | 20 | 0.120 | 0.096 | 1.033 | 10020 | 1.25 | 0.12 | 0.130 | 1.117 | 1.086 | 10090 | 0.12 | 0.12 |
| Example 37 | 20 | 0.308 | 3.086 | 2.890 | 11008 | 0.10 | 0.11 | 0.326 | 3.490 | 3.725 | 11524 | 0.09 | 0.09 |

TABLE 10-continued

| | Average data of all interfaces | | | | | | Interface with the highest roughness among all interfaces | | | | | |
|---|---|---|---|---|---|---|---|---|---|---|---|---|
| Examples/ Comparative Examples | Ra [μm] | Ry [μm] | Rz [μm] | Surface area [μm²] | Ra/ Ry | Ra/ Rz | Ra [μm] | Ry [μm] | Rz [μm] | Surface area [μm²] | Ra/ Ry | Ra/ Rz |
| Example 34 | 0.298 | 3.286 | 3.123 | 11563 | 0.09 | 0.10 | 0.338 | 3.890 | 3.762 | 11984 | 0.09 | 0.09 |
| Example 35 | 0.246 | 2.650 | 2.923 | 11028 | 0.09 | 0.08 | 0.310 | 3.180 | 3.270 | 11215 | 0.10 | 0.09 |
| Example 36 | 0.143 | 1.098 | 1.278 | 10111 | 0.13 | 0.11 | 0.198 | 1.892 | 1.977 | 10295 | 0.10 | 0.10 |
| Example 37 | 0.289 | 3.144 | 3.109 | 11213 | 0.09 | 0.09 | 0.366 | 3.850 | 3.892 | 11901 | 0.10 | 0.09 |

It was confirmed that each Example had a high strength (tensile strength) exceeding the theoretical value. On the other hand, it was confirmed that no Comparative Example had the same property as of Examples.

Also, particularly as apparent from Example 26 and the like, it is found that the effects according to the present invention described hereinbefore can be exhibited as long as any one of the laminate interfaces on the laminated metal layers has a roughness Ra≥0.12. Note that the same also applies to Ry and Rz.

Incidentally, various modifications can be added to the embodiments and each Example described hereinbefore without departing from the gist of the present invention.

In addition, although the embodiments and Examples described hereinbefore were explained mainly as current collectors for battery, the present invention can also be applied not only as the current collector but also as a laminated metal foil for other uses.

INDUSTRIAL APPLICABILITY

As explained hereinbefore, the laminated metal foil, the current collector for battery and the battery according to the present invention can be applied to a wide range of industries of automobiles, electronic equipment, and the like.

REFERENCE SIGNS LIST

C Battery
1 Cathode
2 Separator
3 Anode
31 First metal layer
32 Second metal layer
33 Third metal layer
34 Fourth metal layer
35 Fifth metal layer

The invention claimed is:

1. A current collector for battery, comprising at least:
a first metal plating layer having a thickness of 1 to 10 μm and containing at least a metal selected from Cu, Fe, and Ni; and
a second metal plating layer having a thickness of 1 to 10 μm laminated on the first metal plating layer and containing at least a metal selected from Cu, Fe, and Ni other than the metal of the first metal plating layer,
wherein one of either the first metal plating layer or the second metal plating layer contains Ni and a total thickness ratio of a layer of Ni to the thickness of the current collector is 20% to 50%,
wherein a laminate interface between the first metal plating layer and the second metal plating layer has a roughness Ra≥0.12 μm, and
wherein, when a ratio of an actually-measured surface area to an area of a measurement visual field on the laminate interface is defined as S and an interface roughness index of the laminate interface is defined as Ra/S, the laminate interface has an interface roughness index (Ra/S)≥0.06.

2. The current collector for battery according to claim 1, wherein furthermore the laminate interface has a roughness Ry≥0.1 μm.

3. The current collector for battery according to claim 1, wherein furthermore the laminate interface has a roughness Rz≥0.4 μm.

4. The current collector for battery according to claim 1, wherein the first metal plating layer is composed of Ni, and the second metal plating layer is composed of Cu.

5. The current collector for battery according to claim 4, wherein the first metal plating layer is sandwiched between the second metal plating layers, and the current collector for battery has a thickness of 4 to 10 μm.

6. The current collector for battery according to claim 1, wherein the first metal plating layer is composed of Fe, and the second metal plating layer is composed of Ni.

7. The current collector for battery according to claim 6, wherein the first metal plating layer is sandwiched between the second metal plating layers, and the current collector for battery has a thickness of 4 to 20 μm.

8. A battery comprising a current collector for battery according to claim 1.

* * * * *